United States Patent
Nicol

(10) Patent No.: US 10,505,704 B1
(45) Date of Patent: Dec. 10, 2019

(54) DATA UPLOADING TO ASYNCHRONOUS CIRCUITRY USING CIRCULAR BUFFER CONTROL

(71) Applicant: Wave Computing, Inc., Campbell, CA (US)

(72) Inventor: Christopher John Nicol, Campbell, CA (US)

(73) Assignee: Wave Computing, Inc., Campbell, CA (US)

( * ) Notice: Subject to any disclaimer, the term of this patent is extended or adjusted under 35 U.S.C. 154(b) by 0 days.

(21) Appl. No.: 15/225,768

(22) Filed: Aug. 1, 2016

Related U.S. Application Data

(60) Provisional application No. 62/200,069, filed on Aug. 2, 2015.

(51) Int. Cl.
| | |
|---|---|
| *H04L 7/02* | (2006.01) |
| *H04L 5/24* | (2006.01) |
| *H04L 12/801* | (2013.01) |
| *H04L 12/933* | (2013.01) |
| *H04L 12/863* | (2013.01) |

(52) U.S. Cl.
CPC .............. *H04L 5/24* (2013.01); *H04L 47/39* (2013.01); *H04L 47/6245* (2013.01); *H04L 49/109* (2013.01)

(58) Field of Classification Search
CPC ....... H04L 5/24; H04L 47/6245; H04L 47/39; H04L 49/109; G06F 13/405; G06F 13/128; G06F 13/1673; G06F 13/28; G06F 13/4068; G06F 1/12
See application file for complete search history.

(56) References Cited

U.S. PATENT DOCUMENTS

| | | | |
|---|---|---|---|
| 4,586,189 A * | 4/1986 | Tyrrell | H04L 5/24 370/305 |
| 5,142,631 A | 8/1992 | Murray et al. | |
| 6,075,830 A * | 6/2000 | Piirainen | G06F 13/405 375/220 |
| 6,134,605 A | 10/2000 | Hudson et al. | |
| 6,363,470 B1 | 3/2002 | Laurenti et al. | |
| 8,314,636 B2 | 11/2012 | Hutton et al. | |

(Continued)

FOREIGN PATENT DOCUMENTS

| | | |
|---|---|---|
| JP | 2005165961 A | 12/2003 |
| WO | WO2009131569 A1 | 10/2009 |

OTHER PUBLICATIONS

International Search Report dated Feb. 6, 2015 for PCT/US2014/063591.

*Primary Examiner* — Sam K Ahn
*Assistant Examiner* — Amneet Singh
(74) *Attorney, Agent, or Firm* — Adams Intellex, PLC

(57) ABSTRACT

Disclosed embodiments provide an interface circuit for the transfer of data from a synchronous circuit to an asynchronous circuit. Data from the synchronous circuit is received into a memory in the interface circuit. The data in the memory is then sent to the asynchronous circuit based on an instruction in a circular buffer that is part of the interface circuit. Processing elements within the interface circuit execute instructions contained within the circular buffer. The circular buffer rotates to provide new instructions to the processing elements. Flow control paces the data from the synchronous circuit to the asynchronous circuit.

20 Claims, 9 Drawing Sheets

(56) References Cited

U.S. PATENT DOCUMENTS

| | | |
|---|---|---|
| 8,341,469 B2 | 12/2012 | Miyama et al. |
| 8,493,974 B1 | 7/2013 | Nelson et al. |
| 2002/0167337 A1 | 11/2002 | Chelcea et al. |
| 2004/0125665 A1* | 7/2004 | Chelcea ............... G06F 5/12 365/200 |
| 2005/0135424 A1* | 6/2005 | Karaki ............ G06F 13/4072 370/474 |
| 2005/0141257 A1* | 6/2005 | Kessels ............... G06F 1/08 365/145 |
| 2006/0129720 A1* | 6/2006 | Taniguchi ......... G06F 13/405 710/58 |
| 2007/0097864 A1* | 5/2007 | Bernstein ......... H04L 43/0817 370/232 |
| 2007/0133399 A1 | 6/2007 | Gangwal |
| 2007/0277053 A1* | 11/2007 | Timmermans ....... G06F 13/405 713/401 |
| 2008/0168303 A1 | 7/2008 | Spear et al. |
| 2009/0089605 A1 | 4/2009 | Westwick et al. |
| 2009/0161451 A1* | 6/2009 | Kim .................... G11C 5/14 365/191 |
| 2010/0013517 A1 | 1/2010 | Manohar et al. |
| 2010/0281448 A1 | 11/2010 | He |
| 2011/0062987 A1* | 3/2011 | Manohar ............... G06F 1/12 326/39 |
| 2011/0125936 A1* | 5/2011 | Malleth ............ G06F 13/128 710/26 |
| 2011/0199117 A1 | 8/2011 | Hutchings et al. |
| 2012/0119781 A1* | 5/2012 | Manohar ........ H03K 19/17728 326/38 |
| 2012/0235839 A1 | 9/2012 | Mazumdar et al. |
| 2012/0319730 A1 | 12/2012 | Fitton et al. |
| 2013/0009666 A1 | 1/2013 | Hutton et al. |
| 2013/0009667 A1 | 1/2013 | Calhoun et al. |
| 2013/0043902 A1 | 2/2013 | Rahim et al. |
| 2014/0075144 A1 | 3/2014 | Sanders et al. |
| 2015/0178235 A1* | 6/2015 | Kanigicherla ...... G06F 13/4027 710/314 |

* cited by examiner

DATA UPLOADING TO ASYNCHRONOUS CIRCUITRY USING CIRCULAR BUFFER CONTROL

RELATED APPLICATIONS

This application claims the benefit of U.S. provisional patent application "Data Uploading to Asynchronous Circuitry Using Circular Buffer Control" Ser. No. 62/200,069, filed Aug. 2, 2015.

FIELD OF ART

This application relates generally to logic circuitry and more particularly to data uploading to asynchronous circuitry using circular buffer control.

BACKGROUND

Modern system on a chip (SoCs) are integrated circuits constructed using a variety of modules and/or sub-systems designed to work together to perform a specific function. The systems and subsystems are integrated together using a communication medium such as a system bus. Often, different modules and systems have different timing requirements. The integration of modules with varying clock and timing requirements can cause challenges in the design, testing, and verification of complex SoCs.

One such challenge is the mitigation of metastability. Metastability, a state in which data is unstable due to a conflicting and infinite feedback loop within a circuit, can cause a variety of serious consequences. The unstable data can be fed to other loci in the design and can lead to dangerously high current flow and even circuit damage. Furthermore, different fan-out cones within the circuit path might read the unstable signal as different values, which may cause the design to enter into an unknown functional state, creating data bottlenecks and operational issues. Additionally, such a situation can create excessive propagation delay, leading to timing issues. Data loss and data incoherency can also have adverse effects on any computing system. These factors can cause disruptions in computation, erroneous results, or other device malfunctions.

Communication throughput and latency within a system both depend on the design of the module interfaces, including the transmit and receive clock rates and communication patterns based on typical operation of the modules. Due to the asynchronous nature of the sending and receiving circuitry, a simple mechanism for maintaining data synchronicity, such as a handshake protocol, is prone to problems that could lead to unreliable data transfer. Lost or garbled data can greatly reduce system functionality. Thus, data speed and data integrity are two important factors in any inter-communication scheme.

A communication interface between two processors or controllers typically involves bi-directional data transfer. For example, a processor/controller might interface to another processor to receive and transmit packets of data. The data transfers can be synchronous or asynchronous. A synchronous data transfer uses a mechanism such as a local or system clock to synchronize the speed of the transmitting and the receiving processors. Synchronous data transfer mode simplifies many design considerations within a system but cannot accommodate different clock speeds or processor operating frequencies—however, the ability to account for differing operational frequencies across a design has become a requirement in modern systems.

A large-scale architecture with many subsystems typically contains a large number and variety of interacting clock domains. Synchronizing all of the clock domains is often a prohibitive endeavor because of engineering costs, power consumption, and project-level risks. Accordingly, such architectures and designs increasingly utilize multiple asynchronous clock domains.

But, with the increasing inclusion of various operational frequencies within a design, designers of SoCs and other integrated circuits face challenges when confronted with the need to transfer data between multiple subsystems. Such data can include asynchronous data such as control and configuration commands, isochronous data such as video packets that have strict temporal and jitter requirements, and/or other synchronous, periodic data. Some applications require high levels of data integrity and/or bandwidth. In summary, systems and methods of data transfer between such entities are an invaluable part of modern logic circuit design.

SUMMARY

In highly complex integrated circuits, such as SoCs, ASICs, and field programmable devices, it is often desirable to transfer data from a synchronous circuit to an asynchronous circuit. Disclosed embodiments provide an interface circuit that serves to allow data to be transferred from a synchronous circuit to an asynchronous circuit. Data from the synchronous circuit is received into a memory in the interface circuit. The data in the memory is then sent to the asynchronous circuit based on an instruction in a circular buffer that is part of an interface between the synchronous circuit and the asynchronous circuit. An apparatus for computation is disclosed comprising: a synchronous circuit; an asynchronous circuit; and an interface circuit, interposed between the synchronous circuit and the asynchronous circuit, where the interface circuit comprises: a memory coupled to the synchronous circuit wherein: the memory receives an output from the synchronous circuit; the asynchronous circuit receives an output from the memory; and a circular buffer, containing instructions, with switching components coupled to the synchronous circuit and the memory, wherein, based on the instructions in the circular buffer, data is captured into the memory from the synchronous circuit. The memory can comprise a FIFO register. The synchronous circuit can be clocked with a hum-generated signal and the synchronous circuit can be statically scheduled.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Data transfer and communication between an asynchronous and a synchronous circuit can be problematic due to different clocking regimes. Concepts are described in which a FIFO (First In First Out) register receives data from the synchronous circuitry and stores it until the asynchronous circuitry is ready to receive the stored data. The FIFO and the remainder of the interface circuit can be controlled by a circular buffer which rotates and holds instructions from a branchless instruction set. Disclosed embodiments provide concepts for the transfer of data from a synchronous stage to an asynchronous stage within a circuit. The asynchronous stage and synchronous stage can be operating at independent frequencies. The synchronous stage can be in the form of a switching fabric with multiple switches. The asynchronous circuit can be an ASIC or a SoC for a variety of applications, including, but not limited to, communications, networking, image processing, and/or video processing, to name a few. The synchronous circuit can include a switching fabric circuit that provides data to be processed by the asynchronous circuit and with this switching fabric being configurable. An interface circuit can be configured and disposed to receive data from the synchronous circuit and send it to the asynchronous circuit, and can utilize one or more memories for receiving input from the synchronous stage. In embodiments, a circular buffer within the interface circuit contains instructions that coordinate the transfer of data from one or more switches within the switching fabric circuit of the synchronous stage to the memory. The synchronous stage can be operating at a hum frequency. The hum frequency can be independent of the operating frequency of the asynchronous stage. The interface circuit can operate at a multiple of the hum frequency. Flow control protocols can be used to coordinate the data transfer. In embodiments, a credit-based flow control scheme is used, such as, in some embodiments, a lossless flow control.

The differing frequencies of the asynchronous circuit and synchronous circuit can create a data-transfer issue. An interface circuit in accordance with disclosed embodiments provides methods and apparatus for the transfer of data between the disparate circuits to provide designers with increased flexibility in development of complex integrated circuit systems. The interface circuit allows design flexibility for interfacing a variety of asynchronous circuits, such as special purpose ASICs, SoCs, or other devices, to the synchronous circuits. This flexibility is important for getting full utility out of the synchronous circuit, as it allows a variety of chips and circuits to be easily interfaced to the synchronous circuit, even though the clocks might be different. Thus, disclosed embodiments make up an essential part of a designer's toolkit for interfacing a variety of asynchronous circuits to the synchronous circuit.

Figure 1:
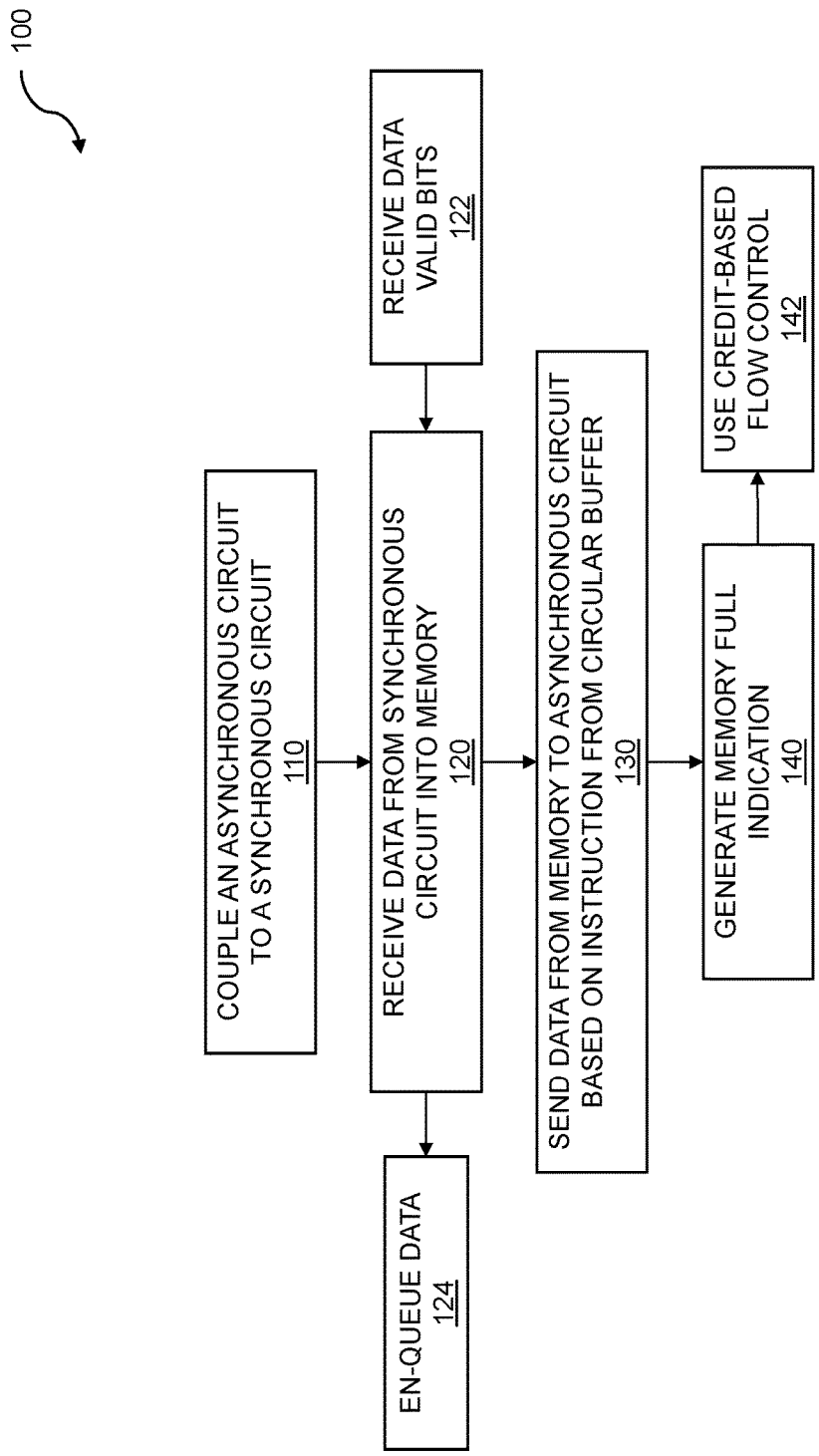
FIG. 1 is a flow diagram for data uploading to asynchronous circuitry using circular buffer control.

FIG. 1 is a flow diagram 100 for data uploading to asynchronous circuitry using circular buffer control. The flow 100 includes coupling an asynchronous circuit to a synchronous circuit 110. This coupling allows data to be transferred from the synchronous circuit to the asynchronous circuit. The flow 100 includes receiving data from the synchronous circuit into a memory 120 based on an instruction from a circular buffer that is part of an interface between the asynchronous circuit and the synchronous circuit. The circular buffer contains multiple instructions that are executed by one or more processing elements to facilitate the transfer of data from the synchronous circuit to the asynchronous circuit. The flow 100 includes receiving data valid bits 122, which provide an indication that the data received from the synchronous circuit is valid. The flow 100 continues with en-queuing the data 124 into a memory. The flow 100 includes sending data from the memory to the asynchronous circuit based on an instruction from the circular buffer 130. The flow 100 further comprises generating a memory full indication 140, signaling that the memory is full, wherein the full signal provides feedback to the synchronous circuit to limit further data from being provided to the memory. The flow 100 can include using credit-based flow control 142. Generating a full signal can be performed using a credit-based flow control protocol. The credit-based flow control can provide criteria for generating the memory full indication. The output from the synchronous circuit can include data for en-queuing. The memory full indication can be used as a condition for pausing the en-queuing of data from the synchronous circuit to the memory. Once the asynchronous circuit retrieves data from the memory, and space becomes available for new data, then the en-queuing of data from the synchronous circuit to the memory can be resumed.

In embodiments, the synchronous circuit can operate at a hum frequency. A hum frequency can be defined as a frequency at which multiple elements within the synchronous circuit self-synchronize to each other. The receiving data from the synchronous circuit into the memory can be performed at a multiple of the hum frequency. Thus, the synchronous circuit can be clocked with a hum-generated signal.

Embodiments provide a processor-implemented method for computation comprising: coupling an asynchronous circuit to a synchronous circuit, receiving data from the synchronous circuit into a memory based on an instruction from a circular buffer that is part of an interface between the asynchronous circuit and the synchronous circuit, and sending data from the memory to the asynchronous circuit based on a request by the asynchronous circuit. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
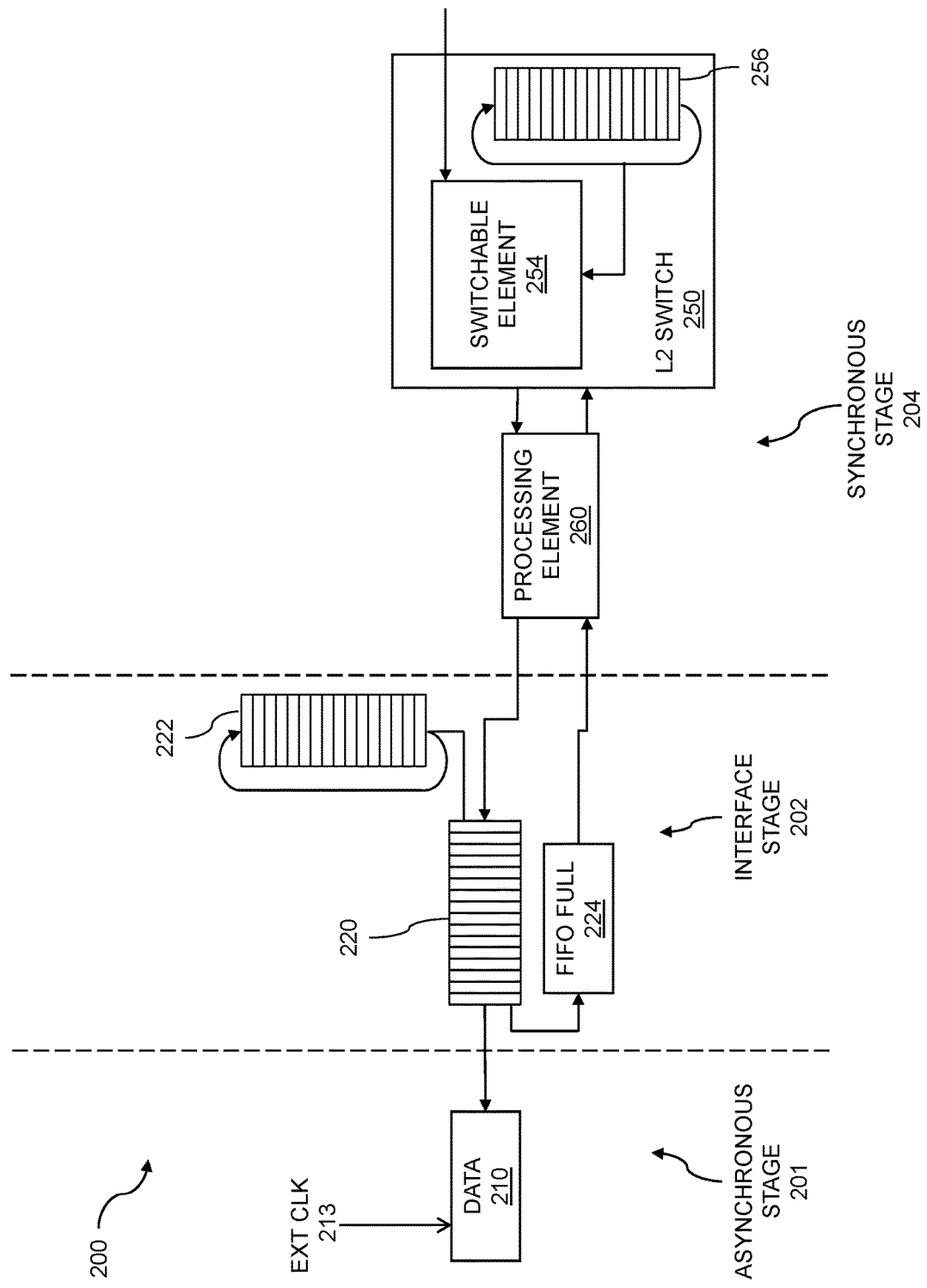
FIG. 2 is a schematic diagram showing an interface arrangement.

FIG. 2 is a schematic diagram 200 showing an interface arrangement. The diagram includes a synchronous stage 204, an interface stage 202, and an asynchronous stage 201. Each stage has one or more corresponding circuits within the stage. The diagram 200 includes a synchronous circuit, an asynchronous circuit, and an interface circuit, interposed between the synchronous circuit and the asynchronous circuit. The interface circuit can comprise a memory 220 coupled to the synchronous circuit. The memory 220 can receive an output from the synchronous circuit. The asynchronous circuit can receive an output from the memory 220, with the output of the memory entering the asynchronous stage as data 210. The described system 200 can include a circular buffer 222 containing instructions, with switching components coupled to the synchronous circuit and the memory. Based on the instructions in the circular buffer, data can be captured into the memory from the synchronous circuit. The example logic shown 200 can further comprise one or more processing elements 260 for processing instructions from the circular buffer 222. The processing element can be capable of executing one or more instructions to carry out the transfer of data from the synchronous stage 204 to the interface stage 202. The synchronous stage can further include a level 2 (L2) switch 250. The L2 switch can comprise a second circular buffer 256. The L2 switch can further comprise switching elements controlled by the second circular buffer. Thus, within the L2 switch 250 can be the second circular buffer 256 which is coupled to a switchable element 254. The L2 switch can be part of a switching fabric. In embodiments, the synchronous stage can be in the form of a switching fabric with multiple switches similar to the L2 switch 250 configured into a network such as a mesh. For example, in a synchronous stage comprising a switching fabric, L2 switches can be configured in a grid-like pattern, where each L2 switch is connected to an adjacent neighbor on a north, south, east, and west side.

The memory 220 can include first-in first-out FIFO storage. The memory 220 can comprise a FIFO register. In embodiments, the memory can include static RAM, dynamic RAM, or another suitable storage technology. The FIFO access can be implemented via software. In some embodiments, the FIFO access is implemented via hardware. The output from the synchronous circuit can only be allowed to be received into the memory when it includes valid data. The valid data can be determined to be valid via valid data bits. Flow control can be used to pace the flow of data from the synchronous circuit to the memory 220. If the memory 220 becomes full, a FIFO FULL signal 224 can be generated and received by the processing element 260 to suspend transfer of data from the synchronous circuit until some data is read from the memory 220 by the asynchronous circuit.

The circular buffer 222 can be statically scheduled. In some embodiments, a compiler or another processing tool can be used to determine the needed instructions for a particular data transfer task. Those instructions can then be loaded into the circular buffer 222 prior to the data transfer operation.

The asynchronous circuit can be clocked with an externally applied clock signal 213. The asynchronous circuit is considered to be asynchronous with respect to the synchronous circuit. Each of the asynchronous circuit and the synchronous circuit can be clocked but they will be clocked with different clocks. In most embodiments, the clocking for the asynchronous circuit and the clocking for the synchronous circuit will not be a multiple of one another. The externally applied clock signal 213 can be derived from an off-circuit or off-chip clock. In embodiments, the externally applied clock signal operates at a frequency ranging from 700 MHz to 1 GHz. The synchronous circuit can be clocked with a hum-generated signal. Thus the clocking for the synchronous circuit can be self-generated within the synchronous circuit and can be a function of the hum fabric. The hum-generated signal can operate at a different frequency, unrelated to that of the externally applied clock signal 213. Thus, embodiments enable data transfer between two circuits with disparate operating frequencies. The memory 220 can be write clocked based on the synchronous circuit. Similarly, the circular buffer 222 can be clocked based on the synchronous circuit. The circular buffer can rotate. The rotating of the circular buffer can include iterating through the contents of the circular buffer. The circular buffer that rotates can provide a sequence of operation instructions. In embodiments, the circular buffer that rotates does not include any branching in the instructions. The circular buffer that rotates can include instructions from a branchless set of operations. The circular buffer that rotates can contain instructions including the instruction for receiving data into the memory from the synchronous circuit. The circular buffer can be dynamically programmed. Thus, in some embodiments, the circular buffer contents can be dynamically updated during a data transfer operation. Stable configuration logic can maintain a stable configuration while the circular buffer is being dynamically programmed. In some embodiments, a program cache (not shown) is configured to store programs that can be swapped into the circular buffers during dynamic reconfiguration. In some embodiments, the program cache can store the program data in a compressed format. In some embodiments, the compressed format is one of a LZ4 or LZ77 format, or another format well-suited to fast decompression. By compressing the program data, the amount of cache memory can be reduced, thereby saving costs and reducing power consumption.

Figure 3:
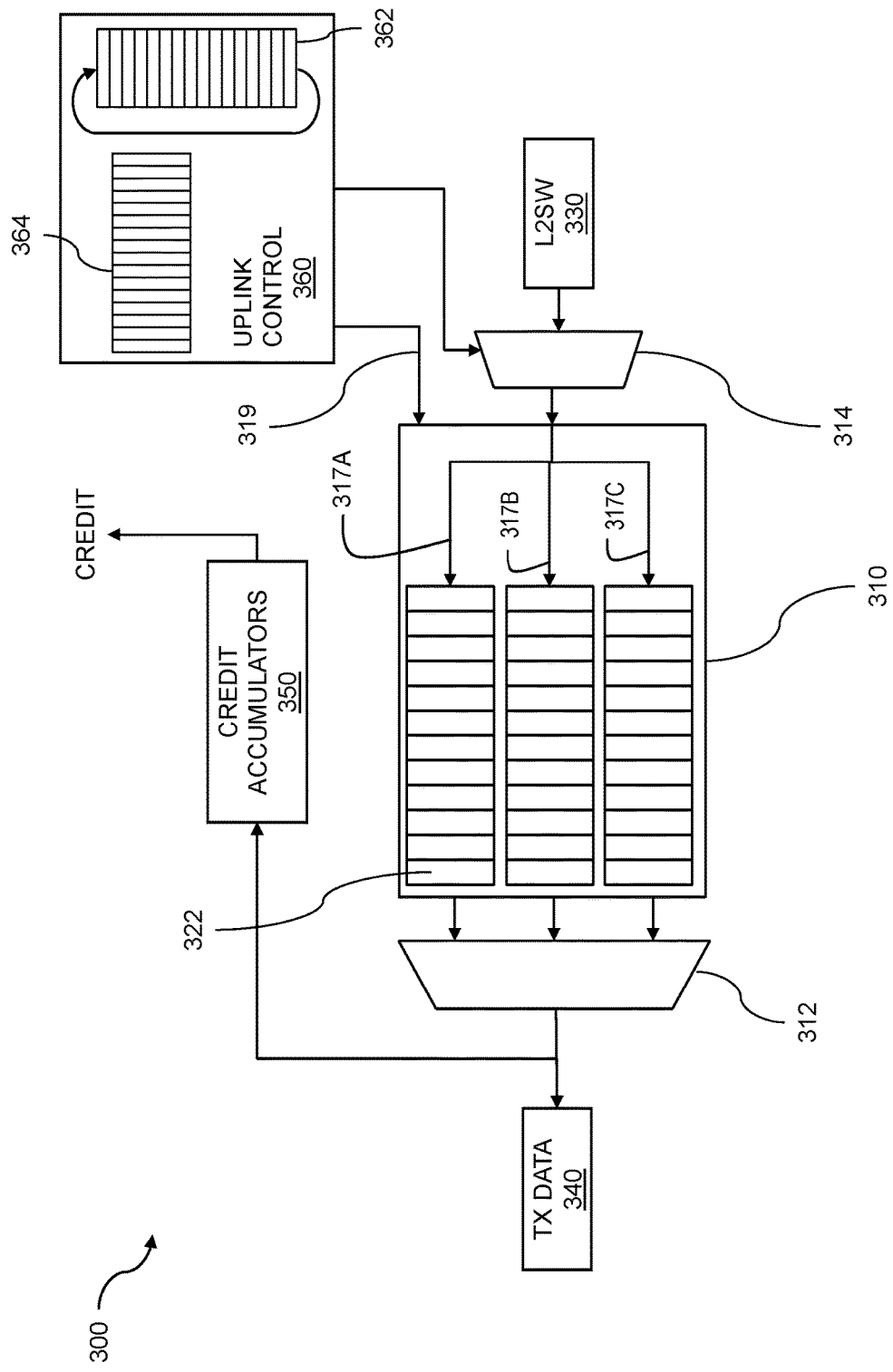
FIG. 3 shows an example multichannel transmit FIFO.

FIG. 3 shows a diagram 300 illustrating an example multichannel transmit FIFO. The memory 310 can include multiple data channels (indicated in the diagram as 317A, 317B, and 317C). While three channels are shown in the diagram 300, other embodiments can have more or fewer channels. The memory 310 can be first-in-first-out storage. The first-in-first-out storage can be comprised of multiple blocks of memory 322, wherein each block corresponds to one of the multiple data channels. The synchronous circuit can include an uplink control circuit 360. The uplink control circuit 360 can include a circular buffer 362 which contains instructions for execution by an internal processing element (not shown). The uplink control circuit can further include additional memory and/or registers 364 for managing additional conditions and indications. The uplink control circuit 360 can be used as a fail-safe mechanism for handling a case where a request for data is made when no data is available. If a request for data is made when no data is available, the uplink control circuit 360 can provide indication via a status signal 319 to indicate this condition. This status signal 319 can be translated into an opcode (operation code) that is inserted in one or more channels of memory 310 to provide an indication to an asynchronous circuit. The synchronous circuit can be comprised of an L2 switch 330 and in some embodiments a L3 switch (not shown). The L2 switch can be used to send data over longer distances. A synchronous stage can include switching fabric with an L3 switch that can be configured in a grid-like pattern where an L3 switch is connected to an adjacent neighbor. An L2 switch, such as the L2 switch 330, can be disposed between non-adjacent L2 switches to facilitate high speed data transfer within the synchronous stage. The L2 and L3 switches can feed into a multiplexor 314, which is controlled by uplink control circuit 360. The uplink control, based on instructions in the circular buffer 362, controls which of the channels (317A-317C) receives data from the L2 or L3 switch. In some cases, the data from a switch can be propagated to multiple channels simultaneously. In some embodiments, the data from the memory 310 is fed through the multiplexor 312 which then transfers the data to the asynchronous stage as TX DATA 340. In embodiments, a flow control mechanism meters data such that when the memory 310 is full, data transfer from the synchronous circuit is paused until the asynchronous circuit has an opportunity to read data from the memory 310, allowing for data transfer to be resumed. In embodiments, a plurality of credit accumulators 350 are used to increment and decrement a credit value to indicate when data transfer is allowable.

The operation of the credit accumulators can operate in a negative or positive polarity, depending on the channel type. For a Direct Memory Access (DMA) channel, the credit count can be initialized to the FIFO size. In other configurations, such as a data channel, the counter can behave as an accumulator, and can be initialized to zero. In some embodiments, such as with a DMA channel, a valid bit is utilized to determine if a data record is populated with valid DMA data. If the valid bit is not set, the data record can be interpreted as empty.

In embodiments, there is a separate queue for each Channel ID, corresponding to a channel (317A-317C). In embodiments, the number of items in each queue corresponds to the number of outstanding read requests from each channel. If a read transaction queue is full, an error is returned to the requestor, indicating that the maximum number of outstanding read requests has been reached. Thus, in embodiments, the full signal is generated based on a credit-based flow control protocol.

Additionally, high and low levels within the FIFO can be established. In embodiments, the levels are programmable and can be set differently for different applications, with dynamic changes possible during the operation of a program. A HIGH LEVEL EXCEEDED signal can be generated by the uplink control circuit via the status signal 319 to indicate when the amount of data in the FIFO has exceeded a predetermined maximum level. Similarly, a LOW LEVEL EXCEEDED signal can be generated by the uplink control circuit via the status signal 319 to indicate when the amount of data in the FIFO has fallen below a predetermined minimum level. These signals can serve as a warning, and upon the receipt of a signal, action can be taken to slow down or speed up the data transfer from the synchronous stage as needed to reduce the probability of encountering an error condition such as a full or empty FIFO. A processing element (such as the element 260 of FIG. 2) can act on signals such as LOW LEVEL EXCEEDED and HIGH LEVEL EXCEEDED to slow down or speed up transfer from the synchronous stage to manage the pace of data transfer.

In other embodiments, a single threshold is used and triggers a doorbell event signal DB. The DB signal is used to inform the host that a minimum amount of data is available in the FIFO. This data can be read immediately.

In embodiments, a de-queue scheduler processes outstanding read requests for each channel in the correct order. The processing is achieved by storing the read requests in separate queues for each channel. In embodiments, a weighted round robin scheduler is used to de-queue data from the uplink FIFOs. Each channel is assigned a priority weight (e.g. a 4-bit unsigned number). When visiting a channel, the scheduler uses the priority weight to determine the number of records to de-queue from the channel. A read transaction table is maintained, and associates a channel ID with address information. In embodiments, the total number of data records that can be pulled out of the uplink FIFOs during a single cycle through the read transaction table is equal to the sum of the weights of all channels.

A scheduling algorithm is indicated in the example pseudocode below using 16 uplink channels, in which the transactions are stored in a list of queues (rdq). rdq has a queue for each channel id:
// Weighted Round Robin Scheduling for de-queueing data records from the uplink FIFO.
// head(rdq[chid_ul]) is head of read transaction queue for channel (chid_ul)
// head(rdq[chid_ul]).count is number of records in read transaction
// size_ul is number of records in uplink fifo for each channel.
// dequeue(rdq[chid_ul,n) removes n records from head of read transaction queue.
for chid_ul=0 . . . 15 { // for each uplink channel (round robin)
  if (head(rdq[chid_ul]).count) { // waiting on uplink data?
    num=minimum(size_ul[chid_ul], head(rdq[chid_ul]).count, wrr[chid_ul];
    rdata=dequeue_ul_fifo(i,num); // get num data records from uplink fifo
    head(rdq[chid_ul].count-=num);
  }
  if (head(rdq[chid_ul].count==0) dequeue(rdq[chid_ul], 1); // remove from read queue
}

Figure 4:
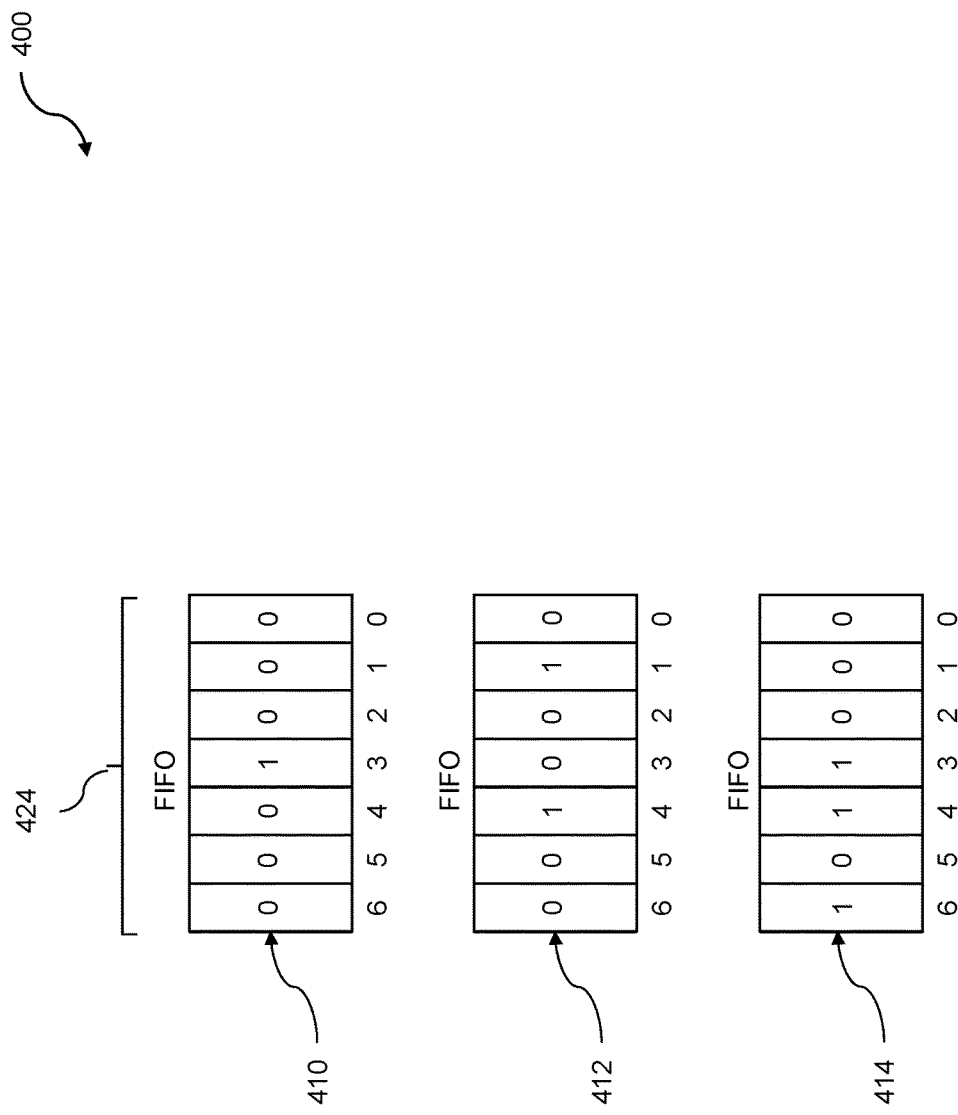
FIG. 4 shows example instruction bits within a circular buffer.

FIG. 4 shows an instruction set 400 indicating example instruction bits within a circular buffer. The instruction bits can be located within an uplink control circular buffer such as the circular buffer 362 of FIG. 3. Data to be transferred can be sourced, where the data can be sourced from a memory, a register, buffer, a FIFO, etc. A field 424 is a destination field. In embodiments, the field 424 is implemented as a bitmask, where an asserted bit indicates a particular FIFO or FIFOs that are to receive the data. The bitmasks can be instructions such as instructions 410, 412, and 414. While three instructions are shown, other numbers of instructions can be included. The instruction 410 indicates that the data that is sourced is to be sent to FIFO 3. The instruction 412 indicates that the data that is sourced is to be sent to FIFO 1 and FIFO 4. The instruction 414 indicates that the data that is sourced is to be sent to FIFO 3, FIFO 4, and FIFO 6.

Figure 5:
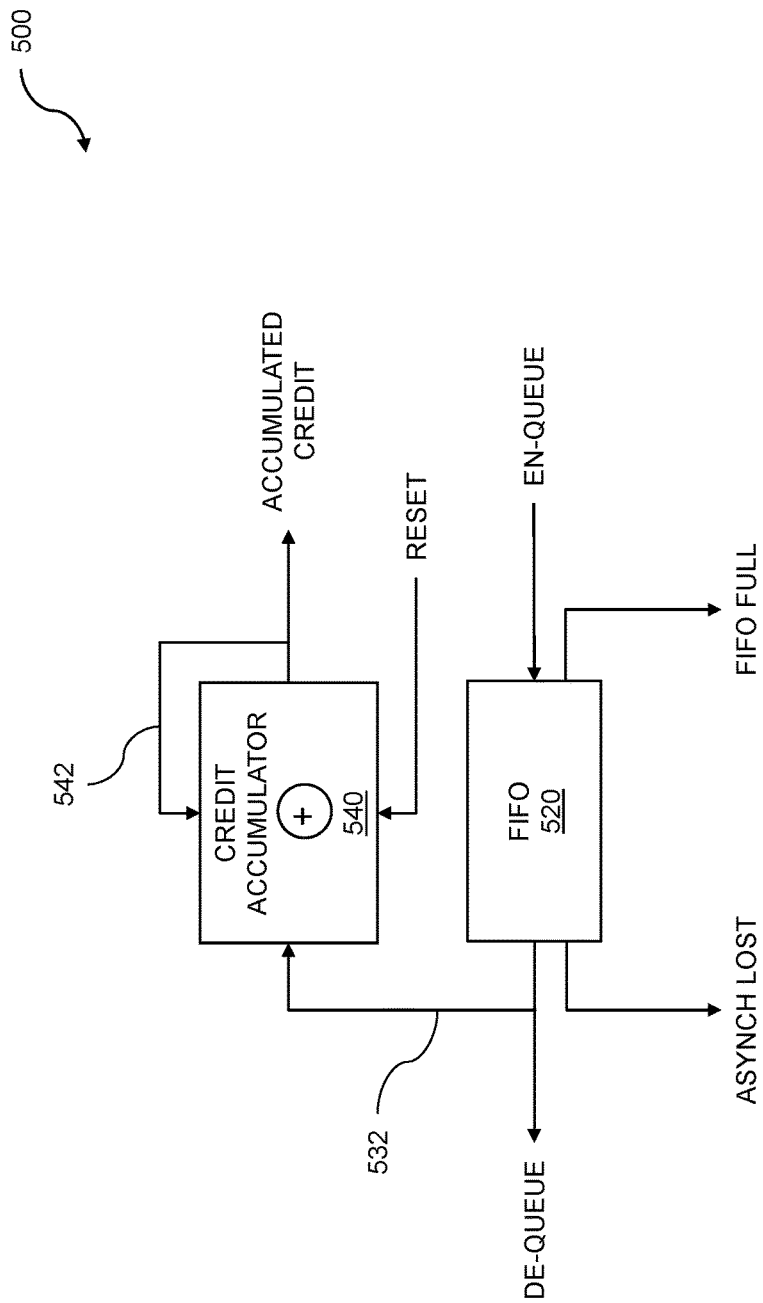
FIG. 5 is a block diagram showing en-queuing and de-queuing of data.

FIG. 5 is a block diagram 500 showing en-queuing and de-queuing of data. Data is en-queued to a FIFO 520 from a synchronous circuit, and de-queued to an asynchronous circuit. A credit accumulator 540 manages available memory space within the FIFO 520. In embodiments, a buffer size is specified, corresponding to the size of the FIFO 520. Operation of the system begins at an initial condition with a certain number of credits, as determined by the buffer size. In embodiments, a RESET signal establishes the initial condition of the credit accumulator 540. As each element of data is en-queued onto the FIFO 520, a credit count decrements by one in the credit accumulator 540. Whenever data is de-queued from the FIFO 520, a signal 532 is sent to the credit accumulator 540 and the credit count increments. Whenever a record is read from the FIFO 520, information in the record pertaining to the number of valid data words in the record is also retrieved. The credit count for the FIFO 520 is increased by the number of words that were read.

The accumulated credit is continuously or periodically monitored via a signal 542. The diagram 500 can include a full signal indicative of the memory being full wherein the full signal provides feedback to the synchronous circuit to limit further data from being provided to the memory. Such a FIFO FULL signal can be generated based on a credit-based flow control protocol. In embodiments, an error condition occurs where the FIFO FULL signal is active, yet valid data is still being sent from the synchronous circuit. Additionally, if a condition occurs in which the accumulated credit is zero, no data can be en-queued into the FIFO 520, and a FIFO FULL signal is generated. Once data is de-queued and the FIFO 520 has free capacity, the count in the credit accumulator 540 is incremented and allows the enqueuing of data to the FIFO 520 to resume. If the FIFO 520 remains full for a predetermined period of time, then an ASYNCH LOST signal is asserted. This signal can indicate a condition where the asynchronous circuit has failed and is no longer retrieving data from the FIFO 520. The ASYNCH LOST signal can trigger a restart of the asynchronous circuit, or in some cases, can trigger a restart of the entire integrated circuit/system of the synchronous stage, interface stage, and asynchronous stage. In this manner the data from the synchronous circuit is paced as the data is transferred to the asynchronous circuit.

Figure 6:
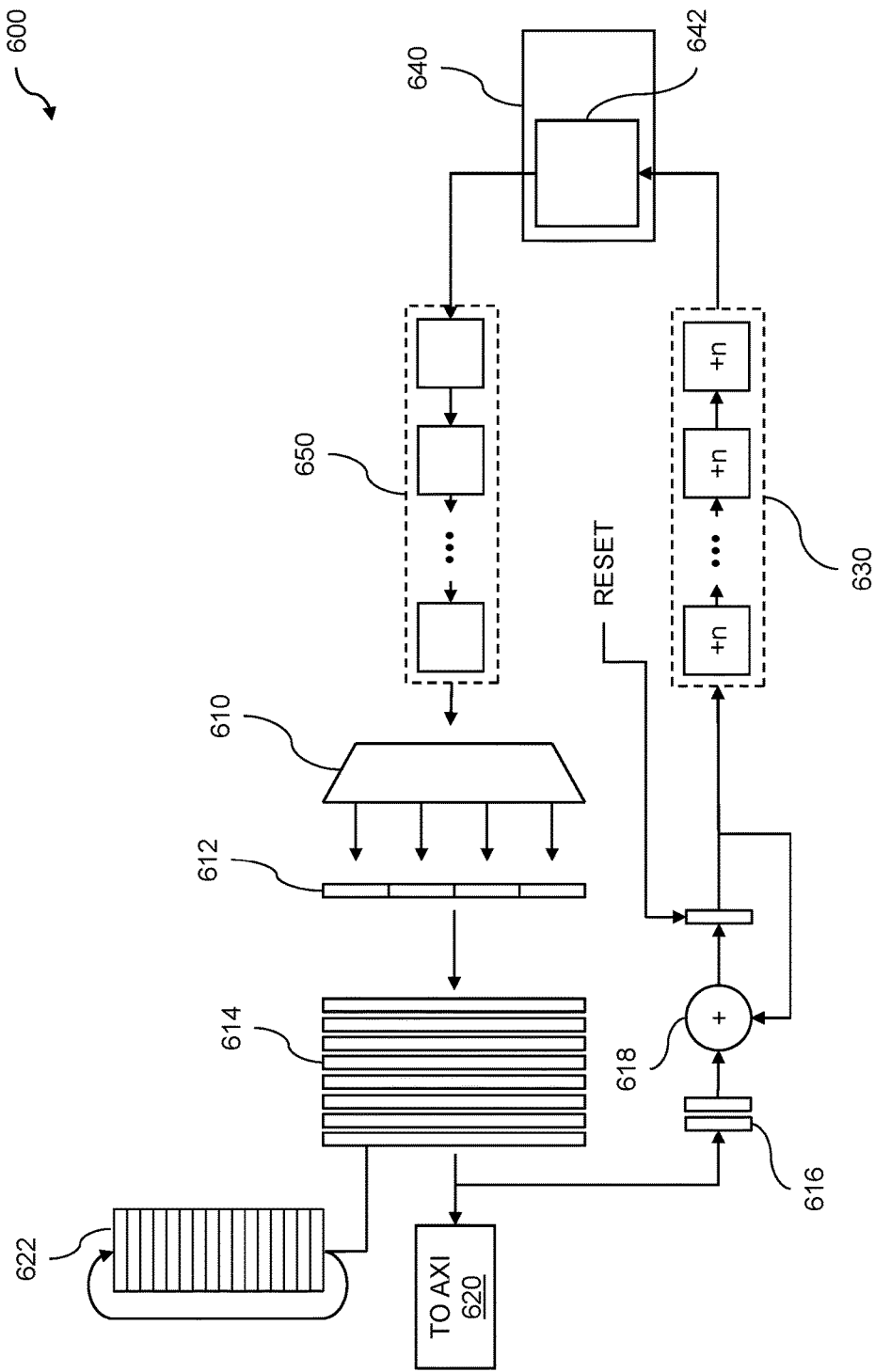
FIG. 6 shows example logic for credit-based flow control.

FIG. 6 shows example logic 600 for credit-based flow control. Synchronous data originates from a source cluster 640. The source cluster 640 can comprise a switched fabric including an L2 and/or an L3 switch. The source cluster 640 can be operating at a hum frequency. The source cluster 640 comprises a credit count register 642 which maintains a status indicating available FIFO capacity. The credit count register 642 can be initialized to the size of a FIFO 614. Data is transferred from the source cluster 640 through a data path 650 to a multiplexor 610 which then routes the data to one or more channels 612. The data path 650 facilitates useful latency handling. The data is then transferred to the FIFO 614. Instructions within the circular buffer 622 control the flow of data into the FIFO 614. As data enters the FIFO 614, a credit count is decremented in the credit count register 642. When data is transferred from the FIFO 614 to the asynchronous circuit (AXI) 620, the available credits 616 are provided via a signal to the credit accumulator 618, which in turn sends the credits over a reverse path 630 to the credit count register 642. A RESET signal can be used to reset the credit accumulator 618 and the credit count register 642 upon startup and/or as part of an error recovery process.

In embodiments, the credit count is initialized to the size of the FIFO, and data is only sent to the data path 650 when the credit count is positive. When data is sent, the credit count is decremented. As long as the credit count remains positive, the data can be sent at any time permitted by the static schedule for the uplink data path. When data is de-queued from the FIFO 614 (by the AXI interface 620) the credit for data removed from the queue can be sent back to the cluster. This can be communicated in a value corresponding to the number of data records that were read from the FIFO 614. The separate reverse path 630 can be established for this purpose. An uplink control circuit (such as 360 of FIG. 3) can be configured to determine when to inject credit values in the reverse path to the source cluster for each channel. The credit accumulator 618 can be included in the system that keeps track of the total accumulated credit between each reverse path. The credit accumulator 618 can be reset during initialization and/or error recovery. The accumulator value can be sent back to the source cluster (possibly along with additional information such as a valid bit and/or signal) to signify a valid credit value.

Figure 7:
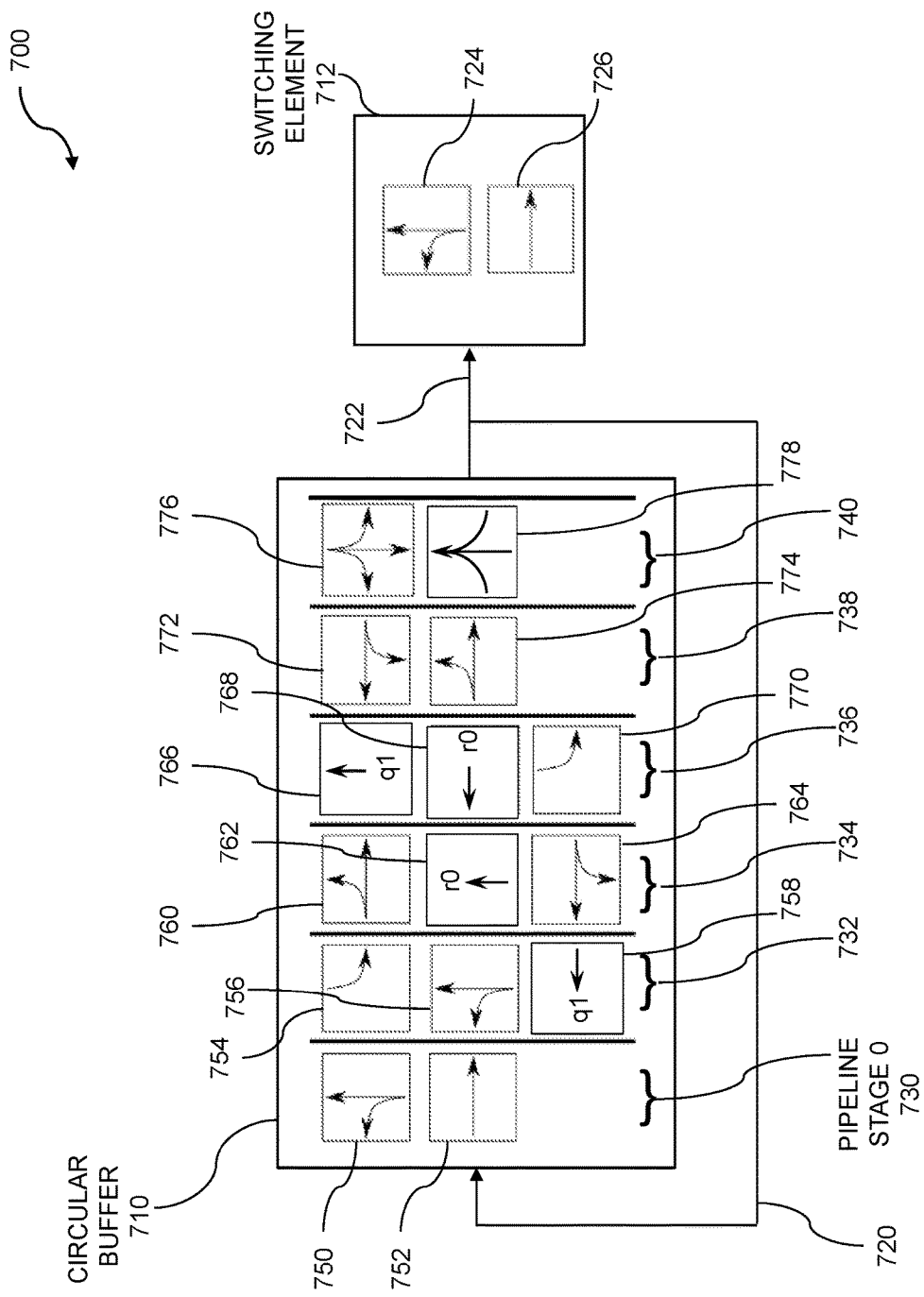
FIG. 7 shows an example circular buffer associated with switching elements.

FIG. 7 shows an example circular buffer associated with switching elements. FIG. 7 is a block diagram 700 showing a circular buffer 710 and a corresponding switching element 712. The block diagram 700 describes an apparatus for data manipulation. The circular buffer 710 contains a plurality of pipeline stages. Each pipeline stage contains one or more instructions, up to a maximum instruction depth. In the embodiment shown in FIG. 7, the circular buffer 710 is a 6×3 circular buffer, meaning that the buffer implements a six stage pipeline with an instruction depth of up to three instructions per stage (column). Hence, the circular buffer 710 can include one, two, or three switch instruction entries per column. In some embodiments, the plurality of switch instructions per cycle comprises two or three switch instructions per cycle. However, in certain embodiments, the circular buffer 710 supports only a single switch instruction in a given cycle. In the example 700 shown, the step Pipeline Stage 0 730 has an instruction depth of two instructions 750 and 752. Though the remaining pipeline stages 1-5 are not textually labeled in the FIG. 700, the stages are indicated by callout numbers, 732, 734, 736, 738, and 740, respectively. Pipeline Stage 1 732 has an instruction depth of three instructions, 754, 756, and 758. Pipeline Stage 2 734 has an instruction depth of three instructions, 760, 762, and 764. Pipeline Stage 3 736 also has an instruction depth of three instructions, 766, 768, and 770. Pipeline Stage 4 738 has an instruction depth of two instructions, 772 and 774. And, Pipeline Stage 5 740 also has an instruction depth of two instructions, 776 and 778. In embodiments, the circular buffer 710 includes 64 columns.

During operation, the circular buffer 710 rotates through configuration instructions. The circular buffer 710 can dynamically change operation of the logical elements based on the rotation of the circular buffer. The circular buffer 710 can comprise a plurality of switch instructions per cycle for the configurable connections.

The instruction 752 is an example of a switch instruction. In embodiments, each cluster has four inputs and four outputs, each designated within the cluster's nomenclature as "north," "east," "south," and "west," respectively. For example, the instruction 752 in the diagram 700 is a west-to-east transfer instruction. The instruction 752 directs the cluster to take data on its west input and send out the data on its east output. Another example of data routing, the instruction 750, is a fan-out instruction. The instruction 750 instructs the cluster to take data on its south input and send out the data on both its north output and its west output. The arrows within each instruction box indicate the source and destination of the data. Continuing with more examples, the instruction 778 is an example of a fan-in instruction. The instruction 778 directs the cluster to take data from its west, south, and east inputs and to send out the data on its north output. Therefore, the configurable connections can be considered to be time multiplexed. Instructions such as those shown in FIG. 7 can be used in the circular buffers that are internal to L2 switches (such as the buffer 256 within the L2 switch 250 of FIG. 2). For a circular buffer in an interface stage (such as the circular buffer 222 of FIG. 2), the instructions can include example FIFO encoding and switch settings such as those shown in FIG. 4. In embodiments, the circular buffer 710 that rotates does not include any branching in the instructions. Thus, the circular buffer 710 that rotates can include instructions from a branchless set of operations.

In embodiments, the clusters implement multiple storage elements in the form of registers. In the example 700 shown, the instruction 762 is a local storage instruction. The instruction 762 directs the cluster to take data from its south input and store it in a register (r0). The instruction 768 is a retrieval instruction. The instruction 768 instructs the cluster to take data from the register (r0) and output it on the cluster's west output. Some embodiments utilize four general purpose registers, here referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

In embodiments, the clusters implement multiple processing elements in the form of processor cores, here referred to as cores q0, q1, q2, and q3. Four cores can be used, though any number of cores is possible. The instruction 758 is a processing instruction. The instruction 758 directs the cluster to take data from the cluster's east input and send the data to a processor q1 for processing. The processor or processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 700 shown, the circular buffer 710 rotates instructions in each pipeline stage into a switching element 712 via a forward data path 722, and also back to the first stage, Pipeline Stage 0 730, via a feedback data path 720. Instructions can include switching instructions, storage instructions, and processing instructions, among others. The feedback data path 720 can allow instructions within the switching element 712 to be transferred back to the circular buffer 710. Hence, the instructions 724 and 726 in the switching element 712 can also be transferred back to the Pipeline Stage 0 as well as the instructions 750 and 752. In addition to the instructions depicted in FIG. 7, a no-op or sleep instruction can also be inserted into a pipeline stage. In embodiments, a no-op instruction causes execution not to be performed for a given cycle. In effect, the introduction of a no-op instruction can cause a column within the circular buffer 710 to be skipped in a cycle. In contrast, not skipping an operation indicates that a valid instruction is being pointed to in the circular buffer. A sleep state can be accomplished by not applying a clock to a circuit, not performing processing within a processor, removing a power supply voltage or bringing a power supply to ground, storing information into a non-volatile memory for future use and then removing the power applied to the memory, or by similar techniques. A sleep instruction is an instruction that causes no execution to be performed until an explicitly specified, predetermined event occurs which causes the logical element to exit the sleep state. The predetermined event can be the arrival or availability of valid data. The data can be determined to be valid using null convention logic (NCL). In embodiments, only valid data is allowed to flow through the switching elements, and Xs (invalid data points) are not propagated by instructions.

In some embodiments, the sleep state is exited based on an instruction applied to a switching fabric. The sleep state can only, in some embodiments, be exited by a stimulus external to the logical element and not based on the programming of the logical element. The external stimulus can include an input signal, which in turn can cause a wake-up or an interrupt service request to execute on one or more of the logical elements. An example of such a wake-up request can be seen in the instruction 758, assuming that the processor q1 was previously in a sleep state. In embodiments, when the instruction 758 takes valid data from the east input of the cluster and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 766. In the case of the instruction 766, data from the processor q1 is moved to the north output of the processor. In some embodiments, if Xs have been placed into the processor q1, such as during the execution of the instruction 758, then Xs would be retrieved from the processor q1 during the execution of the instruction 766 and in turn applied to the north output of the cluster containing the instruction 766.

A collision occurs if multiple instructions route data to a particular port in a given pipeline stage. For example, if the instructions 752 and 754 are in the same pipeline stage, they will both send data to the east output at the same time, thus causing a collision since neither instruction is part of a time-multiplexed fan-in instruction (such as the instruction 778). To avoid potential collisions, certain embodiments use preprocessing by a compiler or other means to arrange the instructions in such a way that there are no collisions when the instructions are loaded into the circular buffer. Thus, the circular buffer 710 can be statically scheduled in order to prevent data collisions. In embodiments, when the preprocessor detects a data collision, the scheduler changes the order of the instructions to prevent the collision. Alternatively or additionally, the preprocessor can insert further instructions such as storage instructions (e.g. the instruction 762), sleep instructions, or no-op instructions, to prevent the collision. Alternatively or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Figure 8:
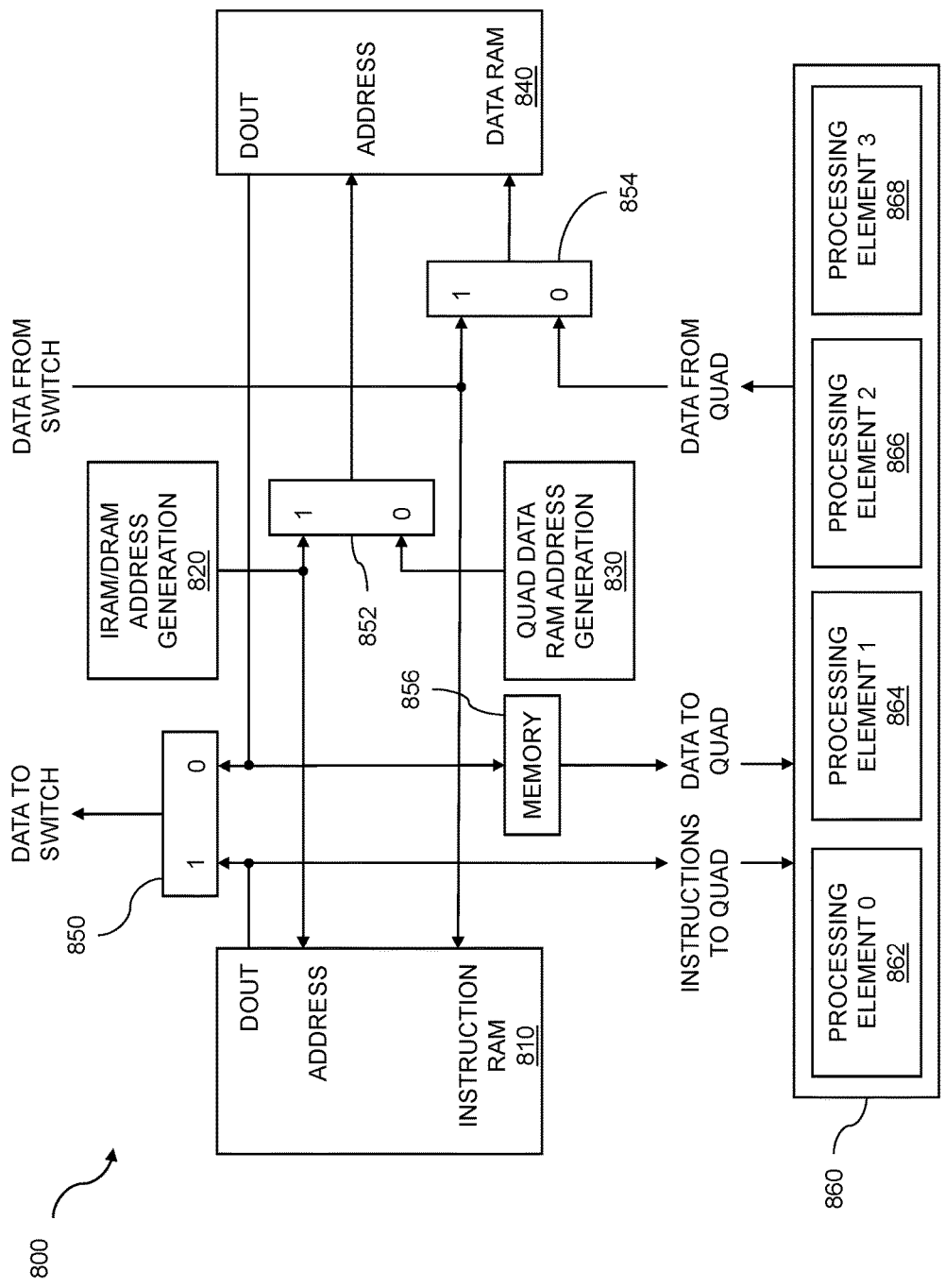
FIG. 8 shows example processing element and IRAM/DRAM interaction.

FIG. 8 shows an example of a processing element and IRAM/DRAM interaction. FIG. 8 is an architecture 800 showing access sharing of processing elements. A quad 860 comprises four processing elements: a processing element 0 862, a processing element 1 864, a processing element 2 866, and a processing element 3 868. To implement paging operations, instructions and data (including state information) can be transferred to and from the processing elements of the quad 860. An instruction RAM 810 can contain instructions that, when executed by processing elements, perform logical operations. A data RAM 840 can contain data (which can include state data) that can be used by the processing elements during logical operations and during the resumption of execution of previously loaded instruction sets. The data from the data RAM 840 can be routed through a switch (mux) 850 to additional switches that can be part of a fabric. The data from the data RAM 840 can also be routed to a memory 856 and then in turn provided to the processing elements 862, 864, 866, and 868 of the quad 860. In embodiments, the memory 856 is used to delay data to the quad 860 by one or more cycles.

During a paging operation, in some cases, before loading a new instruction set into circular buffers, the current instruction set can be saved off to the paging memory and can further include saving data, such as state data that is associated with the current execution of the processing elements. In such an operation, data from the quad 860 can be routed through a switch (mux) 854 to the data RAM 840.

A quad data RAM address generation 830 module contains logic that facilitates stepping through the state data stored in the data RAM 840. Similarly, an IRAM/DRAM address generation 820 module contains logic that facilitates stepping through the data stored in the instruction RAM 810. The stored data is used when loading up the instruction RAM 810 and the data RAM 840, and is also input to the switch 850. The data is then routed to additional switches that are part of the switches and connections going to and from the paging memory and the circular buffers and registers. The quad data RAM address generation 830 and the IRAM/DRAM address generation 820 are fed through a switch 852 to the data RAM 840. The data RAM 840 can be updated based on instructions that are executed from the instruction RAM 810. In embodiments, there can be arbitration between the processing elements 862, 864, 866 and 868.

Figure 9:
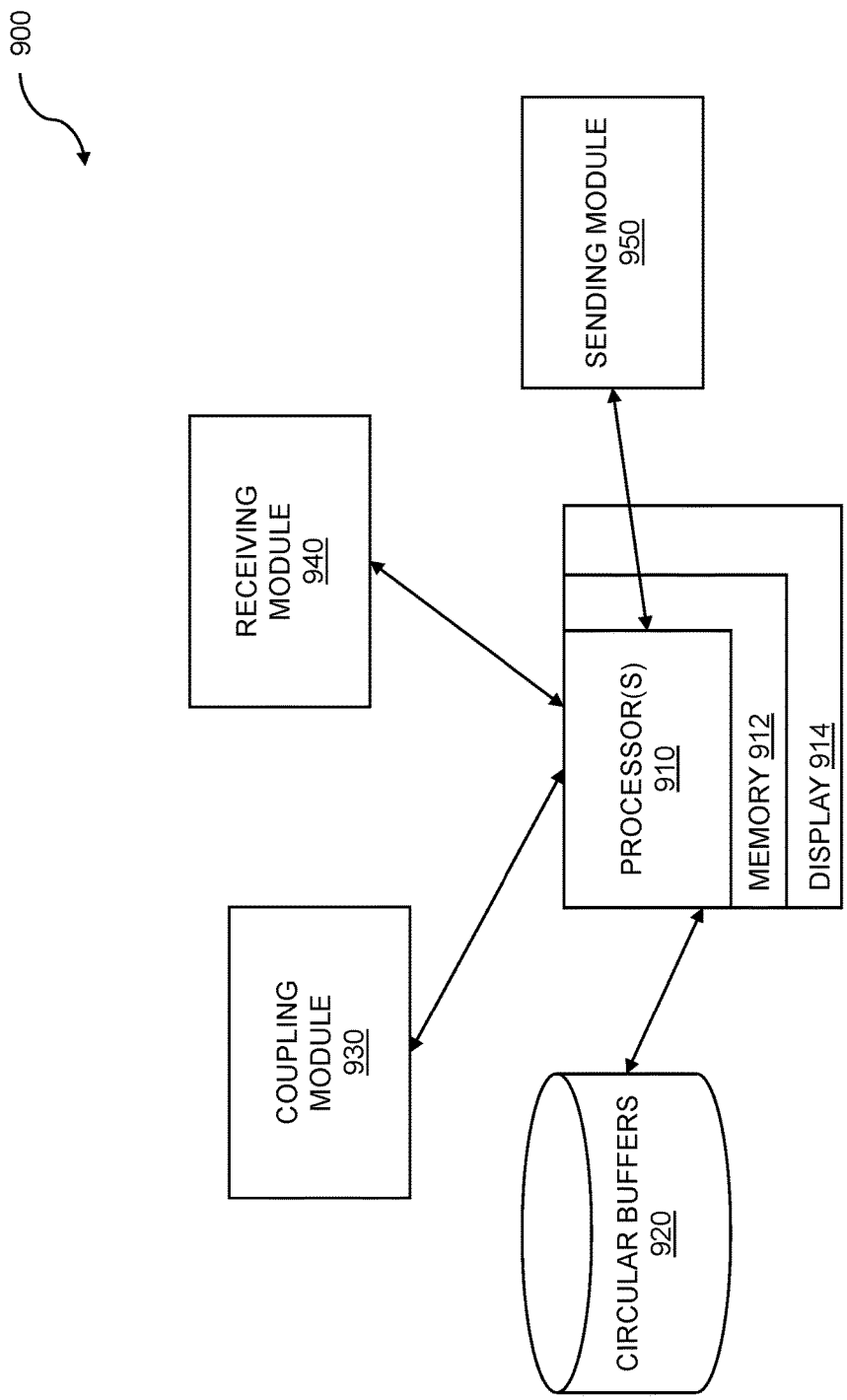
FIG. 9 is a system diagram for circuit and logic implementation.

FIG. 9 is a system diagram for circuit and logic implementation. The system 900 can include a computer program product embodied in a non-transitory computer readable medium for implementation of a computation apparatus comprising code which causes one or more processors to perform operations of designing a processing architecture. The processing architecture can include an interface circuit, configured to be disposed between a synchronous circuit and an asynchronous circuit, where the interface circuit comprises: a memory coupled to the synchronous circuit wherein: the memory receives an output from the synchronous circuit; the asynchronous circuit receives an output from the memory; and a circular buffer, containing instructions, with switching components coupled to the synchronous circuit and the memory, wherein, based on the instructions in the circular buffer, data is captured into the memory from the synchronous circuit.

The system 900 can include a memory 912 which stores instructions and one or more processors 910 coupled to the memory 912 wherein the one or more processors 910 are configured to design a processing architecture comprising: an interface circuit, configured to be disposed between a synchronous circuit and an asynchronous circuit, where the interface circuit comprises a memory coupled to the synchronous circuit and wherein the memory receives an output from the synchronous circuit and where the asynchronous circuit receives an output from the memory; and a circular buffer 920, containing instructions, with switching components coupled to the synchronous circuit and the memory, wherein, based on the instructions in the circular buffer, data is captured into the memory from the synchronous circuit. The switching components coupled to the synchronous circuit and the memory can be implemented using a coupling module 930. The circuitry to implement the receiving of an output from the synchronous circuit can be implemented by a receiving module 940. The circuitry to implement sending data from the memory to the asynchronous circuit based on a request by the asynchronous circuit can be implemented by a sending module 950. The modules shown in FIG. 9 can be implemented in software and/or hardware as part of an automation system. Information about the various designs can be shown on a display 914 which can be attached to the one or more processors 910. The display 914 can be any electronic display, including but not limited to, a computer display, a laptop screen, a net-book screen, a tablet screen, a cell phone display, a mobile device display, a remote with a display, a television, a projector, and the like.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. An apparatus for computation comprising:
   a synchronous circuit;
   an asynchronous circuit; and
   an interface circuit, interposed between the synchronous circuit and the asynchronous circuit, where the interface circuit comprises:
      a memory coupled to the synchronous circuit wherein:
         the memory receives an output from the synchronous circuit;
         the asynchronous circuit receives an output from the memory; and
      a circular buffer, containing a plurality of pipeline stages where each pipeline stage contains one or more instructions, wherein, based on the one or more instructions in the circular buffer, data is captured into the memory from the synchronous circuit, wherein the circular buffer is rotatable, includes instructions from a branchless set of operations, and is dynamically programmed, wherein stable configuration logic maintains a stable configuration while the rotatable circular buffer is being dynamically programmed, and wherein the synchronous circuit includes a switching fabric with multiple level 2 (L2) switches, each of the L2 switches connected to all of its adjacent neighbors and each of the L2 switches comprising a second circular buffer.

2. The apparatus of claim 1 wherein the memory includes first-in first-out storage.

3. The apparatus of claim 2 wherein the memory includes multiple data channels.

4. The apparatus of claim 3 wherein the first-in first-out storage is comprised of multiple blocks of memory, wherein each block corresponds to one of the multiple data channels.

5. The apparatus of claim 1 wherein the output from the synchronous circuit is only received into the memory when the output from the synchronous circuit includes valid data.

6. The apparatus of claim 1 further comprising a full signal indicative of the memory being full wherein the full signal provides feedback to the synchronous circuit to limit further data from being provided to the memory.

7. The apparatus of claim 6 wherein the full signal being active and valid data being sent from the synchronous circuit is an error condition.

8. The apparatus of claim 1 wherein the circular buffer is statically scheduled.

9. The apparatus of claim 1 wherein the output from the synchronous circuit comprises en-queuing data.

10. The apparatus of claim 1 wherein the synchronous circuit is statically scheduled.

11. The apparatus of claim 1 wherein the synchronous circuit is clocked with a hum-generated signal.

12. The apparatus of claim 1 wherein the memory is write clocked based on the synchronous circuit.

13. The apparatus of claim 12 wherein the circular buffer is clocked based on the synchronous circuit.

14. The apparatus of claim 1 wherein the rotatable circular buffer contains instructions including an instruction for receiving data into the memory from the synchronous circuit.

15. The apparatus of claim 1, wherein each of the L2 switches further comprises switching elements controlled by the second circular buffer.

16. A processor-implemented method for computation comprising:
   coupling an asynchronous circuit to a synchronous circuit;
   receiving data from the synchronous circuit into a memory based on an instruction stored in a circular buffer that is part of an interface circuit, interposed between the asynchronous circuit and the synchronous circuit; and
   sending data from the memory to the asynchronous circuit based on a request by the asynchronous circuit,
   wherein the circular buffer contains a plurality of pipeline stages where each pipeline stage contains one or more instructions, wherein the circular buffer is rotatable, includes instructions from a branchless set of operations, and is dynamically programmed, wherein stable configuration logic maintains a stable configuration while the rotatable circular buffer is being dynamically programmed, and wherein the synchronous circuit includes a switching fabric with multiple level 2 (L2) switches, each of the L2 switches connected to all of its adjacent neighbors and each of the L2 switches comprising a second circular buffer.

17. The method of claim 16 wherein the synchronous circuit operates at a hum frequency, and wherein receiving data from the synchronous circuit into the memory is performed at a multiple of the hum frequency.

18. The method of claim 16 further comprising generating a full signal indicative of the memory being full, wherein the full signal provides feedback to the synchronous circuit to limit further data from being provided to the memory.

19. The method of claim 18 wherein the generating a full signal is performed using a credit-based flow control protocol.

20. A computer program product embodied in a non-transitory computer readable medium for implementation of a computation apparatus comprising code which causes one or more processors to perform operations of designing a processing architecture including:

an interface circuit, configured to be disposed between a synchronous circuit and an asynchronous circuit, where the interface circuit comprises:

a memory coupled to the synchronous circuit wherein:

the memory receives an output from the synchronous circuit;

the asynchronous circuit receives an output from the memory; and a circular buffer, containing a plurality of pipeline stages where each pipeline stage contains one or more instructions, wherein, based on the one or more instructions in the circular buffer, data is captured into the memory from the synchronous circuit, wherein the circular buffer is rotatable, includes instructions from a branchless set of operations, and is dynamically programmed, wherein stable configuration logic maintains a stable configuration while the rotatable circular buffer is being dynamically programmed, and wherein the synchronous circuit includes a switching fabric with multiple level 2 (L2) switches, each of the L2 switches connected to all of its adjacent neighbors and each of the L2 switches comprising a second circular buffer.

* * * * *